US012253441B2

(12) United States Patent
Kaiser et al.

(10) Patent No.: US 12,253,441 B2
(45) Date of Patent: Mar. 18, 2025

(54) INSPECTION SYSTEM FOR A PLURALITY OF SEPARABLE INSPECTION OBJECTS

(71) Applicant: LAW-NDT MESS- UND PRÜFSYSTEME GMBH, Schiesheim (DE)

(72) Inventors: Christoph Kaiser, Herold (DE); Hamid Reza Shojaei Mahllati, Wiesbaden (DE)

(73) Assignee: LAW-NDT MESS- UND PRÜFSYSTEME GMBH, Schiesheim (DE)

( * ) Notice: Subject to any disclaimer, the term of this patent is extended or adjusted under 35 U.S.C. 154(b) by 243 days.

(21) Appl. No.: 17/920,482

(22) PCT Filed: May 6, 2021

(86) PCT No.: PCT/EP2021/062060
§ 371 (c)(1),
(2) Date: Oct. 21, 2022

(87) PCT Pub. No.: WO2021/224418
PCT Pub. Date: Nov. 11, 2021

(65) Prior Publication Data
US 2023/0144348 A1 May 11, 2023

(30) Foreign Application Priority Data
May 6, 2020 (DE) .................... 10 2020 112 222.5

(51) Int. Cl.
*G01N 1/18* (2006.01)
*G01N 1/14* (2006.01)
(Continued)

(52) U.S. Cl.
CPC ............... *G01N 1/18* (2013.01); *G01N 1/14* (2013.01); *G01N 27/87* (2013.01);
(Continued)

(58) Field of Classification Search
None
See application file for complete search history.

(56) References Cited

U.S. PATENT DOCUMENTS 7,466,542 B2 * 12/2008 Kuo ...................... G06F 1/1616
361/679.55
10,406,562 B2 * 9/2019 Stopper .................. B07C 5/362
(Continued)

FOREIGN PATENT DOCUMENTS

DE      3200075 A1      7/1983
DE      4329193 A1 *    3/1995  ............... B07C 5/02
(Continued)

OTHER PUBLICATIONS

Search Report issued on Jan. 26, 2021, in connection with corresponding German Application No. 10 2020 112 222.5 (14 pp., including machine-generated English translation).
(Continued)

*Primary Examiner* — Suman K Nath
*Assistant Examiner* — Nigel H Plumb
(74) *Attorney, Agent, or Firm* — Maier & Maier, PLLC

(57) ABSTRACT

An inspection system for a plurality of separable inspection objects, which may accommodate different inspection applications and facilitate the use of linear or straight sections in the conveying path. The inspection system may include a feed device for inspection objects, a conveying device for inspection objects, an inspection unit, and an ejecting device. The feed device is configured to feed the inspection objects to a feed position of the conveying device. The conveying device includes a plurality of receptacles, with each receptacle being configured and disposed such that exactly one inspection object of the plurality of inspection objects can be conveyed along a conveying path in said receptacle and that two respective inspection objects from the plurality of inspection objects have a spacing along the
(Continued)

conveying path that is defined by the plurality of receptacles. The inspection unit is disposed at an inspection position on the conveying path.

22 Claims, 5 Drawing Sheets

(51) Int. Cl.
*G01N 27/87* (2006.01)
*G01N 27/90* (2021.01)
*G01N 27/904* (2021.01)
*G01N 35/00* (2006.01)
*G01N 1/00* (2006.01)

(52) U.S. Cl.
CPC ....... *G01N 27/9006* (2013.01); *G01N 27/904* (2013.01); *G01N 35/00871* (2013.01); *G01N 2001/002* (2013.01); *G01N 2001/1436* (2013.01); *G01N 2001/185* (2013.01); *G01N 2035/00831* (2013.01)

(56) References Cited

U.S. PATENT DOCUMENTS

| 2008/0117581 | A1 | 5/2008 | Kuo et al. |
| 2020/0101498 | A1* | 4/2020 | Ackley ................ B07C 5/3422 |

FOREIGN PATENT DOCUMENTS

| DE | 102017209752 A1 | 12/2018 |
| DE | 102018113291 A1 | 12/2019 |
| EP | 0230583 A2 | 8/1987 |
| EP | 2105216 A1 | 9/2009 |

OTHER PUBLICATIONS

International Search Report (with English Translation) and Written Opinion (with Machine Translation) issued on Feb. 21, 2022, in corresponding International Application No. PCT/EP2021/062060; 25 pages.

International Preliminary Report on Patentability issued on Nov. 17, 2022, in corresponding International Application No. PCT/EP2021/062060, 23 pages.

* cited by examiner

INSPECTION SYSTEM FOR A PLURALITY OF SEPARABLE INSPECTION OBJECTS

FIELD

The present invention relates to an inspection system for a plurality of separable inspection objects, comprising a feed device for the plurality of inspection objects, a conveying device for the plurality of inspection objects, an inspection unit and an ejecting device, wherein the feed device is configured and disposed such that the plurality of inspection objects can be fed by means of the feed device to a feed position of the conveying device, wherein the conveying device comprises a plurality of receptacles, wherein each receptacle is configured and disposed such that exactly one inspection object of the plurality of inspection objects can be conveyed along a conveying path in said receptacle and that two respective inspection objects of the plurality of inspection objects have a spacing along the conveying path that is defined by the plurality of receptacles, wherein the inspection unit is disposed at an inspection position on the conveying path and wherein the ejecting device is disposed behind the inspection unit on the conveying path and is configured such that the plurality of inspection objects can be ejected from the plurality of receptacles of the conveying device by means of the ejecting device.

BACKGROUND

Inspection systems for inspecting inspection objects that are produced in large numbers and can be separated are known from the prior art for a wide variety of applications in industrial quality control. The intent is to fully inspect a large number of inspection objects in as short a time as possible, i.e., as part of a 100% inspection. To achieve this, the inspection objects, which are initially present as loose material, have to first be separated and then arranged in such a way that each of the inspection objects can be inspected individually and reproducibly. Inspection systems for separable inspection objects which comprise a conveying device in the form of a rotary table are known for this purpose from the state of the art. Along its outer circumference, the rotary table comprises a plurality of slot-shaped receptacles in which a respective inspection object is guided.

Such inspection system cannot be used flexibly for different inspection applications. Inspection systems comprising a conveying device in the form of a rotary table moreover have limitations with respect to the accuracy of the inspection.

SUMMARY

With this in mind, the object of the present invention is to provide an inspection system that exhibits a high degree of flexibility. The object of the present invention is also to provide an inspection system that enables high inspection accuracy.

According to the invention an inspection system for a plurality of separable inspection objects is provided, which comprises a feed device for the plurality of inspection objects, a conveying device for the plurality of inspection objects, an inspection unit and an ejecting device, wherein the feed device is configured and disposed such that the plurality of inspection objects can be fed by means of the feed device to a feed position of the conveying device, wherein the conveying device comprises a plurality of receptacles, wherein each receptacle is configured and disposed such that exactly one inspection object of the plurality of inspection objects can be conveyed along a conveying path in said receptacle and that two respective inspection objects of the plurality of inspection objects have a spacing along the conveying path that is defined by the plurality of receptacles, wherein the inspection unit is disposed at an inspection position on the conveying path, wherein the ejecting device is disposed behind the inspection unit on the conveying path and is configured such that the plurality of inspection objects can be ejected from the plurality of receptacles of the conveying device by means of the ejecting device and wherein the conveying device is configured such that the conveying path has at least one straight section and the inspection position is disposed on the at least one straight section.

Unlike for conveying devices in the form of rotary plates, for the present invention it is necessary that the conveying path comprises at least one straight section wherein the inspection position of the inspection unit is disposed on this straight section. Designing the conveying path to be straight, at least in sections, makes it possible to dispose a plurality of inspection units along the straight section of the conveying path. The length of the straight section can easily be varied as needed and therefore more or less inspection units can be placed there. In the prior art, on the other hand, a modification of the inspection section usually requires a complete replacement of the rotary table with a rotary table having a different radius.

Furthermore, in a conveying device in the form of a rotary plate, the inspection section is curved. In the context of the present invention, the inspection section is the path across which the inspection object moves as it is being sensed by a sensor of an inspection unit.

In the prior art, therefore, errors resulting from the curved inspection section have to be subtracted out of the results of the measurements. This is not necessary with a linear or straight inspection section.

In one embodiment of the invention, the conveying device is configured such that the plurality of receptacles are guided on a closed movement path, whereby the conveying path takes up a part of the movement path. The conveying device can therefore operate continuously, because the receptacles always return to their original location after a circulation.

In one embodiment of the invention, the movement path of the plurality of receptacles comprises two straight sections, whereby at least one of the straight sections is a part of the conveying path. In one embodiment of the invention, both straight sections are part of the conveying path. In one embodiment, the two straight sections of the movement path are disposed opposite to one another.

In a further embodiment, the inspection system comprises two inspection units, wherein the inspection units are disposed at two inspection positions along the conveying path, wherein the conveying path comprises two straight sections and wherein a first of the two inspection positions is disposed on a first of the two straight sections and wherein a second of the two inspection positions is disposed on a second of the two straight sections. The arrangement with two straight sections of the conveying path, wherein an inspection unit is provided on each of the straight sections, has the advantage that it saves space compared to an arrangement in which two inspection units are disposed on a single straight and correspondingly extended section of the conveying path.

It goes without saying that, in one embodiment of the invention in which the conveying device comprises a closed movement path with two straight sections, the movement path is symmetrical, preferably mirror-symmetrical with respect to a plane perpendicular to the straight sections of the movement path, and preferably rotationally symmetrical with a two-fold rotational symmetry.

In one embodiment of the invention, the plurality of receptacles for the individual inspection objects is configured such that a cylindrical safety component can be held in each one. Examples of such a cylindrical safety component include a screw, a pin or a bolt.

A variety of implementations for the configuration of the individual receptacles are possible. In one embodiment of the invention, each receptacle is configured in the form of a magnetic nest. A permanent magnet is preferably used to hold the respective inspection object in the receptacle.

In one embodiment, the receptacle serves to hold or receive a cylindrical safety component comprising a head.

In one embodiment, the receptacle comprises a support surface lying in a plane and a perforation in said support surface, wherein the perforation comprises an opening on one side of the support surface, such that an individual inspection object can be inserted through the opening into the perforation. In one embodiment, such a receptacle is configured in the form of a slot or an elongated hole, whereby the slot is open on one side of the support surface so that the inspection object can be inserted into the perforation in the receptacle from there.

Such an embodiment of a receptacle is in particular suitable for receiving a cylindrical safety component comprising a head. The cylindrical portion of the safety component is inserted through the opening into the perforation in the support surface. An underside of the head of the safety component rests on the support surface of the receptacle.

It goes without saying that a plurality of receptacles can be provided in a single support surface.

In one embodiment of the invention each one of the plurality of receptacles comprises a support surface lying in a plane and a perforation in said support surface, wherein the perforation comprises an opening on one side of the support surface, such that an inspection object of the plurality of inspection objects can be inserted through the opening into the perforation, wherein the support surface can be moved from a first position into a second position.

Being able to move the support surface from a first position into a second position makes it possible, depending on the arrangement, to easily eject the inspection object from the receptacle or enable the respective inspection object to be fed into the receptacle in a less error-prone manner.

In one embodiment of the invention, the first position of the support surface is determined by the fact that the support surface extends substantially horizontally. In this first position of the support surface, then, the inspection object is held firmly in the receptacle.

If the support surface is now moved from the first position into a second, non-horizontal position, so that the inspection object moves in the direction of the opening, gravity will cause the inspection object to pass through the opening and fall out of the receptacle.

In one embodiment of the invention, the support surface can be pivoted about a pivot axis from the first position into the second position, whereby the pivot axis is parallel to a direction of movement of the receptacle along the conveying path.

Furthermore, in one embodiment, the ability to move the support surface from the first position into the second position enables a reduction of the susceptibility to interference when feeding inspection objects into the receptacles of the conveying device.

In one embodiment of the invention, the support surface is transparent, so that an inspection unit can sense the respective inspection object fully from only one side of the support surface.

In one embodiment of the invention, the feed device comprises a feed bevel, whereby the feed bevel is configured and disposed such that, when the inspection system is in operation, the plurality of inspection objects slide over the feed bevel in the direction of the plurality of receptacles at the feed position, preferably driven by gravity, whereby the support surface in the second position is parallel to a transfer section of the feed surface. This prevents the inspection objects from bumping into and getting caught on a height offset between the transfer section of the feed bevel and the support surface. This is the case in particular when, in one embodiment of the invention, the transfer section of the feed bevel is disposed higher than the support surface in its second position. In one embodiment of the invention, the support surface in the second position and the transfer section of the feed bevel are in one plane, so that there is no offset between the two surfaces. The surfaces on which the inspection objects slide, on the one hand the feed surface and on the other hand the support surface, are thus brought into line with one another.

In one embodiment of the invention, the conveying device comprises a stationary actuating cam at the feed position, wherein the receptacle and the actuating cam are configured and disposed such that the actuating cam moves the support surface from the first position into the second position when the receptacle reaches the feed position.

The engagement between the receptacle and the actuating cam makes it possible to easily provide a positive guidance of the receptacle with the support surface in order to bring about the movement of the support surface from the first position into the second position.

In one embodiment of the invention, the conveying device comprises a guide rail and a plurality of carriages guided on the guide rails, whereby each one of the carriages carries at least one receptacle of the plurality of receptacles. Such an implementation of the conveying device with one or more guide rails and a plurality of carriages guided on the guide rails makes it possible for the length of the conveying device to be variable. The carriages are furthermore guided on the guide rail with the receptacles in a precise and reproducible manner.

While a single carriage in one embodiment comprises exactly one receptacle for exactly one inspection object, a carriage in another embodiment comprises a plurality of receptacles of which each one receives exactly one inspection object.

Whereas the ability to move the support surface from the first position into the second position was previously considered as an option for the inspection system according to the invention comprising at least one straight section of the conveying path, an inspection system comprising a movable support surface of the receptacle, as described in detail in the following, also constitutes an independent invention without the conveying device being configured with a conveying path comprising at least one straight section, whereby the inspection position is disposed on the at least one straight section.

According to a further aspect, therefore, the present application also relates to an inspection system for a plurality of separable inspection objects, comprising a feed device for the plurality of inspection objects, a conveying device for the plurality of inspection objects, an inspection unit and an ejecting device, wherein the feed device is configured and disposed such that the plurality of inspection objects can be fed by means of the feed device to a feed position of the conveying device, wherein the conveying device comprises a plurality of receptacles, wherein each receptacle of the plurality of receptacles is configured and disposed such that exactly one inspection object of the plurality of inspection objects can be conveyed along a conveying path in said receptacle and that two respective inspection objects of the plurality of inspection objects have a spacing along the conveying path that is defined by the plurality of receptacles, wherein the inspection unit is disposed at an inspection position on the conveying path, wherein the ejecting device is disposed behind the inspection unit on the conveying path and is configured such that the plurality of inspection objects can be ejected from the plurality of receptacles of the conveying device by means of the ejecting device, and wherein each one of the plurality of receptacles comprises a support surface lying in a plane and an opening in said support surface, wherein the perforation in the plane comprises an opening on one side, so that an inspection object of the plurality of inspection objects can be inserted through the opening into the perforation and wherein the support surface can be moved from a first position into a second position.

It goes without saying that all of the embodiments discussed above and in the following are possible as optional configurations for this invention as well.

In one embodiment of the previously described inventions, the inspection unit comprises a housing having a defined installation space, wherein the housing can be releasably connected to the conveying device so that the inspection unit can be replaced with another inspection unit. In one embodiment, the housing of the inspection unit can in particular be held interchangeably in or at an inspection station of the inspection system on the conveying device.

In one embodiment of the invention, the housing has a defined width, wherein the straight section of the conveying path is an integer multiple of the width, so that a plurality of inspection units having the same width can be connected to the conveying device.

The inspection system can thus be constructed in a modular manner, whereby one or more inspection units with their housings can be connected to the conveying device, depending on the application, and whereby it is possible to exchange the individual inspection units.

In one embodiment of the invention, the inspection unit comprises at least one sensor, whereby the sensor is disposed such that it senses a property of the plurality of inspection objects at the inspection position. In one embodiment of the invention the sensor is selected from a group consisting of an eddy current sensor, a probe, a conductivity sensor and a camera or a combination thereof.

In one embodiment of the invention, the inspection unit is configured to carry out an inspection of the inspection object selected from a group consisting of a crack detection, for example an inspection for cracks created by the pressing process over the entire contour of the screw on rotational planes, a microstructure inspection, for example an inspection for defects in the material composition, for the inclusion of foreign material or air pockets or to distinguish between hardened and unhardened parts, an internal/external contour inspection, in particular of the head of a cylindrical safety component, for example by mechanical inspection of the screwability and the penetration depth or by evaluation via a camera system, a mechanical inspection for roundness, in particular of a head of a cylindrical safety component, an inspection for pressing defects using a contour sensor, a straightness inspection, for example checking the straightness of the shaft of a cylindrical safety component by means of a measurement in three planes, an automated visual inspection using a camera, for example onto the head of a cylindrical safety component from above, onto the head of a cylindrical safety component from below, in particular to inspect a sealing surface for contamination and points of impact, onto the head of a cylindrical safety component from the side, in particular to check the dimensions of the head, or from the side onto the shaft, in particular to check the dimensions of the shaft, a visual inspection for the presence/absence of contours, inscriptions, coatings and contamination, points of impact, a visual inspection of the dimensions of various contours of the inspection object, an automated all-around visual inspection using a camera (360° camera inspection), a coating inspection, for example the inspection of an adhesive coating, or a combination thereof.

Such measuring methods are suitable for quantitatively sensing the quality of the properties of an inspection object, in particular an inspection object made of metal.

In one embodiment of the invention in addition to the at least one inspection unit, the inspection system comprises a processing device for further processing or treating the inspection object. Examples of such a processing device are an assembly device, for example for pressing in or pressing on or screwing or unscrewing additional components onto the inspection object, in particular with simultaneous torque and position control and a coating device, for example for applying a coating, in particular a lubricant or a protective coating, to a cylindrical safety component.

In one embodiment of the present invention, the conveying device comprises at least one guide rail and a plurality of carriages guided on the at least one guide rail, whereby each one of the plurality of carriages carries at least one of the plurality of receptacles.

The design of the conveying device with a system comprising a guide rail and a plurality of carriages guided on the guide rail makes it possible to easily vary the length of the conveying path. The guide rail can thus be lengthened by adding further segments or shortened by removing segments, which then also varies the number of carriages being held on the guide rails.

In a further embodiment, the conveying device comprises a plurality of segments, whereby the straight section of the conveying path comprises an integer multiple of segments. Such a configuration makes it possible to flexibly adapt the length of the straight section to the inspection task, it is in particular possible to accommodate different numbers of inspection units on the straight section.

In one embodiment of the invention, the plurality of receptacles are guided on a closed movement path, whereby the movement path comprises two straight sections and two curved sections which provide a deflection of 180°. Such an embodiment has the advantage that two segments comprising curved sections of the movement path and, depending on the inspection task the inspection system is intended for, a flexible number of segments comprising two respective straight sections of the movement path have to be provided for each system.

In one embodiment of the invention, the inspection system further comprises an inspection station at the inspection position of the inspection system, a data transmission device, a first data interface and an identifier, wherein the inspection unit comprises an inspection controller comprising a read-out device and a second data interface connected to the inspection controller, wherein the inspection station is configured such that the inspection unit is interchangeably connected to the inspection station, wherein the second data interface is separably connected to the first data interface of the inspection system for exchanging data, wherein the data transmission device is operatively connected at least to the ejecting device and via the first data interface and the second data interface to the inspection unit for transmitting information, wherein the identifier biuniquely identifies the inspection position, wherein the identifier is encoded in such a way that the identifier can be read by the inspection unit when the inspection unit is inserted into the inspection station, wherein the read-out device is configured such that the identifier can be read with the read-out device when the inspection system is in operation and wherein the inspection controller is configured such that the inspection controller reads the identifier by means of the read-out device when the inspection unit is inserted into the inspection station.

The underlying idea of this embodiment of the present invention is to provide the inspection units in the form of interchangeable modules and to provide the necessary structure for data processing. The respective inspection unit can be inserted interchangeably into the inspection system at the inspection station. An inspection unit having a first functionality can thus be replaced with an inspection unit having a second functionality. The same inspection system can then be used for different inspection tasks. The solution according to the invention also makes it possible to provide a plurality of inspection stations at a plurality of inspection positions in an inspection system. By replacing one or more of the plurality of inspection units, or changing an order of the plurality of inspection units, it is then possible to implement freely configurable inspection sequences in one and the same inspection system.

According to this embodiment, an inspection unit reads the identifier that biuniquely identifies the inspection position when it is inserted into an inspection station of the inspection system. This preferably takes place automatically, whereby the read-out process does not have to be triggered separately by an operator. After reading the identifier, the inspection unit knows in which inspection station and thus at which inspection position of the existing inspection system it is disposed. This is the key to a number of possible configurations of a flexible inspection system.

In one embodiment of the invention, the inspection system comprises a plurality of inspection stations at a plurality of inspection positions on the conveying path behind the feed position in the conveying direction. In such an embodiment, the inspection system comprises a plurality of identifiers that each biuniquely identify exactly one inspection position of an inspection station, whereby each identifier is encoded in such a way that the respective identifier can be read automatically by the inspection unit when an inspection unit is inserted into the respective inspection station.

In one embodiment of the invention, the inspection system comprises a plurality of feed devices at a plurality of feed positions. This makes it possible to feed different types of inspection objects to the same inspection section. In particular, in addition to the actual inspection objects from ongoing production, defective items can be fed at definable points in time in order to subject the system to a tolerance measurement or testing. Also, in one embodiment, a plurality of feed devices enables the realisation of a plurality of inspection sections in the same inspection system with only one conveying device.

In one embodiment of the invention, the inspection system comprises a plurality of ejecting devices at a plurality of ejection positions. Having a plurality of ejecting devices makes it possible to sort the inspection objects on the basis of the inspection result when they are ejected from the inspection system.

In one embodiment of the invention, the identifier is encoded in an identification device that is disposed at the inspection station and can be read by the inspection unit.

A possible example of such an identification device is an RFID chip, which can be read by an RFID reader of the inspection unit, or a QR code, which can be read by a QR code reader of the inspection unit.

In one embodiment of the invention, the identification device is formed by a plug connector disposed at the inspection station. In one embodiment, the plug connector preferably comprises a plurality of contact pins or contact sockets, whereby the arrangement of contact pins or contact sockets that are present and/or connected to a connecting line encodes the identifier.

In one embodiment, for example, the plug connector comprises an arrangement of n×m contact sockets, wherein n and m denote integers. However, only one characteristic pattern of these n×m sockets is provided with a connecting line. Thus, by determining which contact sockets are contacted, the inspection unit can identify which occupancy pattern the contacts of the plug connector show and thus clearly identify at which inspection station the inspection unit is being held.

One way to encode the identifier for the inspection position is to use elements of the first data interface to encode the identifier.

It therefore goes without saying that, in one embodiment, such a plug connector disposed at the inspection station at the same time also constitutes a component of the first data interface. Data is then transmitted from the inspection system to the inspection unit and vice versa via this plug connector of the first data interface. Therefore, in one embodiment, the first data interface comprises a plug connector disposed at the inspection station, whereby the plug connector of the first data interface can be connected to a complementary plug connector of the inspection unit.

In a further embodiment, the data transmission device is a TCP/IP data network. In one embodiment, the first data interface includes a switch having a biunique IP address or a plurality of ports that each have a biunique IP address. In one embodiment, such a switch is associated with exactly one inspection station so that its IP address forms the identifier of the inspection position of that inspection station. In an alternative embodiment, one respective port of a switch with its own IP address is associated with exactly one inspection station. It goes without saying that, in one embodiment comprising a plurality of inspection stations, each inspection station is associated with exactly one switch or exactly one port of a switch having a biunique IP address. When the inspection unit is connected to such a switch in such an embodiment, the inspection unit reads the IP address and thus obtains information about the inspection position of the inspection station into which it has been inserted.

Thus, in one embodiment of the invention, the identifier is encoded as the IP address of the first data interface.

In one embodiment of the invention, the first data interface is a wireless interface, for example a WLAN or Bluetooth interface. Since there may be no plug connector provided at the respective inspection station in such an embodiment, the identifier in such an embodiment is encoded in an RFID chip or QR code at the inspection station, for example.

A data transmission device in the sense of the present application includes any system suitable for transmitting data between the elements of the inspection system connected to the data transmission device, which makes it possible to exchange data or information between the elements connected to the data transmission device. Examples of such a data transmission device are a BUS and an IP based data network.

The data transmission device of the inspection system according to the invention is connected at least to the ejecting device and the first data interface, so that, in this minimum configuration, an ejection command can be transmitted from the inspection unit, which can be connected to the first data interface, to the ejecting device.

In a further embodiment, it is not only possible for one or more inspection units to be held at the inspection stations in an interchangeable and freely configurable manner; rather, the same modular concept is implemented for the ejecting device and/or the feed device as well.

In one embodiment, therefore, the inspection system further comprises an ejection station and an identifier that biuniquely identifies the ejection position. The ejection station is configured such that the ejecting device is interchangeably inserted into the ejection station, wherein a first data interface which is connected to a second data interface of the ejecting device is provided at the ejection station, wherein the data transmission device is operatively connected to the ejecting device via the first data interface and the second data interface for transmitting information, wherein the identifier is encoded in such a way that the identifier can be read by the ejecting device when the ejecting device is inserted into the ejection station and wherein the ejecting device comprises a reading device for reading the identifier.

It goes without saying that the first and second data interfaces, the identifier and the read-out device for the ejection station and/or the ejecting device can be configured as described above for the inspection station and the inspection unit.

In one embodiment of the invention, the inspection system comprises a system controller connected to the data transmission device. In one embodiment, the system controller is a computer.

In one embodiment, such a system controller takes on only administrative tasks for operating the inspection system, but does not control the inspection and the subsequent sorting of the inspection objects. In one embodiment of the invention, the system controller is configured such that it does not generate ejection commands with which an ejection of an inspection object at the ejecting device would be triggered.

In one embodiment of the invention, the system controller takes on the control of the conveying device, for example setting or regulating the speed at which the plurality of inspection objects are moved along the conveying path.

In a further embodiment of the invention, the system controller is used to record and/or collect error messages from the individual devices of the inspection system and/or to signal such errors to an operator.

At least one of the aforementioned objects is also achieved by an inspection unit which can be inserted into an inspection station of an inspection system, wherein the inspection unit comprises an inspection controller and a second data interface connected to the inspection controller, wherein the second data interface can be connected to a first data interface of the inspection system for exchanging data, wherein the inspection controller comprises a read-out device, wherein the read-out device is configured such that, when the inspection system is in operation, it reads an identifier which biuniquely identifies an inspection position of the inspection station of the inspection system and wherein the inspection controller is configured such that the inspection controller reads the identifier when the inspection unit is inserted into the inspection station. The inspection unit can comprise all of the features optionally described here, even if they are presented in combination with only the inspection system.

In one embodiment of the invention, the inspection controller is configured to read the identifier automatically, i.e., without a separate initiation of the read-out process by an operator. Reading is in particular initiated automatically when the inspection unit is inserted into the inspection station.

In one embodiment of the invention, the read-out device comprises not only logical elements, for example implemented as software, but also hardware elements, such as an RFID reader or a plug connector that is complementary to the plug connector of the inspection system and is connected to the rest of the inspection controller via leads.

In one embodiment, the inspection controller is a computer. The decisive factor is that the inspection controller is a unit which is separate from the system controller and remains in the inspection unit when the inspection unit is removed from the inspection station.

In one embodiment of the invention, the inspection controller is configured such that, when the inspection system is in operation, the inspection controller uses the inspection position encoded in the identifier to calculate a time required by an inspection object between being sensed by the inspection unit at the inspection position and reaching the ejection position, and, when the inspection system is in operation, the inspection controller issues an ejection command for the ejecting device and sends it to the ejecting device via the first and the second data interface and via the data transmission device, so that an inspection object sensed by the inspection unit is ejected by the ejecting device when it reaches said ejecting device.

This configuration according to the invention of the inspection controller of the inspection unit makes it possible for the entire inspection task, from the detection of the respective inspection object to the ejection of the inspection object at the designated location, to be carried out by the inspection controller which is integrated in the inspection unit. The system controller itself, insofar as it is even needed at all, then only takes on coordinating and administrative tasks.

In one embodiment, the time required by an inspection object between being sensed by the inspection unit at the inspection position and reaching the ejection position is described by an integer multiple of a processing cycle of the inspection system. In one embodiment, such a processing cycle is defined as the advancement of the conveying device by exactly one inspection object being held in the conveying device or by exactly one receptacle of the conveying device for an inspection object. The time required by an inspection object between being sensed by the inspection unit at the inspection position and reaching the ejection position can thus be calculated by the inspection controller, even if there are interruptions in the conveyance of the inspection system.

An inspection unit inserted into an inspection station has information about where it is located in the respective inspection system based on the biunique identifier of the inspection station. It decides at which ejection position an inspected inspection object is to be ejected and transmits the ejection command directly to the respective ejecting device, without the need for a system controller.

In one embodiment of the invention, the following scenario is conceivable. An inspection system comprising a defined number of inspection stations, a feed device, and a defined number of ejecting device is created. This basic configuration is stored for each inspection unit to be used with this inspection system. When a thus preconfigured inspection unit is inserted, the inspection unit then knows, based on reading the identifier of the respective inspection station, at which inspection position of the respective inspection system it is inserted and can independently take on all of the inspection tasks.

For example, the information stored in advance in the inspection unit includes that there are two ejecting devices at two different ejection positions, an ejecting device for defective inspection objects and an ejecting device for inspection objects that have passed the inspection successfully. After sensing an inspection object, the inspection controller of the inspection unit ensures that the respective inspection object is ejected at the correct ejection position without involving a system controller.

In one embodiment of the invention, the system controller is configured such that it transmits at least one operating parameter of the inspection system to the inspection controller of the inspection unit when the system is in operation. A preconfiguration of the inspection units can thus be omitted in one embodiment.

In one embodiment, the transmitted operating parameter includes a description of the configuration of the inspection system. In one embodiment of the invention the operating parameter includes one or more ejection positions.

In one embodiment, after reading the identifier of the inspection position of the inspection station into which it has been inserted, the inspection unit can then independently derive all of the information it needs to control the ejection of the respective inspection objects.

In one embodiment of the invention, an operating parameter transmitted from the inspection system to the inspection controller is used to calculate the time required by an inspection object between being sensed by the inspection unit at the inspection position and reaching the ejection position.

Another example of an operating parameter in the sense of the present application is the conveying speed of the conveying device.

In one embodiment of the invention, the inspection controller is configured to store a plurality of preconfigurations, so that a single inspection unit can be used flexibly in a plurality of inspection systems. An operator can then select a preconfiguration when inserting the inspection unit into the inspection system, or the preconfiguration is selected automatically.

In one embodiment of the invention, the identifier additionally includes biunique information about the respective inspection system and/or about the configuration of the inspection system and/or about the ejection positions of the inspection system.

In one embodiment of the invention, the combination of an inspection system comprises a plurality of inspection stations at which a plurality of inspection units are held.

In one embodiment, the inspection controllers of the plurality of inspection units are configured such that the inspection units can also share data with one another. This makes it possible to increase the efficiency and reliability of the inspection system comprising a plurality of inspection units.

In one embodiment of the invention, an inspection unit which is first in the conveying direction of the conveying device sends a signal to an inspection unit which is second in the conveying direction when the first inspection unit has detected a defective inspection object, so that the second inspection unit does not even inspect this item. In a further embodiment, the first inspection unit sends a signal to the second inspection unit when it has detected an inspection object that is too big. The second inspection unit then retracts a probe, for example, or takes some other measure to avoid damage to the second inspection unit.

In one embodiment of the invention, the inspection controller of the inspection unit is configured to eject a preselected number of inspection objects at a predefined ejection position, so that they are subjected to a separate tolerance measurement.

In one embodiment, the inspection controller is configured to also control the feed device. In one embodiment of the invention, the inspection system comprises two feed devices at two feed positions. The inspection controller is configured such that the feed positions introduce reference parts into the inspection system at regular or random time intervals. These reference parts are always ejected from the inspection system at the same ejection position after being sensed by the inspection unit, so that they can be fed back into the system at a later point in time.

In one embodiment of the invention, the inspection controller of the inspection unit is configured to eject a preselected number of inspection objects at a predefined ejection position, in order to subject these inspection objects ejected there to a random sample measurement.

In one embodiment of the invention, the inspection system is configured to provide a clocked advancement of the conveying device. In such an embodiment, the advancement of the conveying device is intermittent, wherein the duration of the interruptions in the advancement depends on how long a processing step in a processing device takes, for example, or also how much time is needed to complete an inspection in an inspection unit. It is in particular possible to configure the inspection system such that it enables work cycles having variable lengths.

Whereas the spacing between the individual receptacles is fixed in one embodiment of the invention, the occupancy of the receptacles can be varied. The feed device can in particular be controlled such that only every $x^{th}$ receptacle is occupied by an inspection object. The inspection system can thus be adapted by its controller to different dimensions of inspection objects.

In one embodiment, the occupancy of the receptacles is stored in the inspection controller as a basic configuration of the inspection system.

In a further embodiment, the occupancy of the receptacles is sent from the system controller to the respective inspection controller as an operating parameter.

In a further embodiment, the inspection unit comprises a sensing device associated with the inspection controller for determining a designated position on each carriage of the conveying device. The designated position on the respective carriage is, for example, its start. In one embodiment, the sensing device is a light barrier. Such an embodiment makes it possible to determine or calibrate the work cycle of the inspection system by means of the inspection controller. The work cycle, which then forms the basis for the further control of the inspection system, in particular the ejection commands, is independent of any mechanical play of the conveying device. If the sensing device detects the start of a carriage, for example, it knows that the conveying device has been advanced since the previously detected carriage by a number of work cycles that is equal to the number of receptacles for the inspection objects on the carriage.

While the modularity of the conveying device was previously considered as an option for the inspection system according to the invention comprising at least one straight section of the conveying path, an inspection system comprising a modularly constructed conveying device, as described in detail in the following, also constitutes an independent invention without the conveying device being configured with a conveying path comprising at least one straight section.

According to a further aspect, therefore, the present application also relates to an inspection system for a plurality of separable inspection objects, comprising a feed device for the plurality of inspection objects, a conveying device for the plurality of inspection objects, an inspection unit and an ejecting device, wherein the feed device is configured and disposed such that the plurality of inspection objects can be fed by means of the feed device to a feed position of the conveying device, wherein the conveying device comprises a plurality of receptacles, wherein each receptacle of the plurality of receptacles is configured and disposed such that exactly one inspection object of the plurality of inspection objects can be conveyed along a conveying path in said receptacle and that two respective inspection objects of the plurality of inspection objects have a spacing along the conveying path that is defined by the plurality of receptacles, wherein the inspection unit is disposed at an inspection position on the conveying path, wherein the ejecting device is disposed behind the inspection unit on the conveying path and is configured such that the plurality of inspection objects can be ejected from the plurality of receptacles of the conveying device by means of the ejecting device and wherein the conveying device comprises a plurality of segments which can be releasably connected to one another.

It goes without saying that all of the embodiments discussed above and in the following are possible as optional configurations for this invention as well.

BRIEF DESCRIPTION OF THE FIGURES

Further advantages, features, and possible applications of the present invention will become apparent from the following description of an embodiment and the associated figures. In the figures, the same elements are identified with the same reference signs.

DETAILED DESCRIPTION

Figure 1:
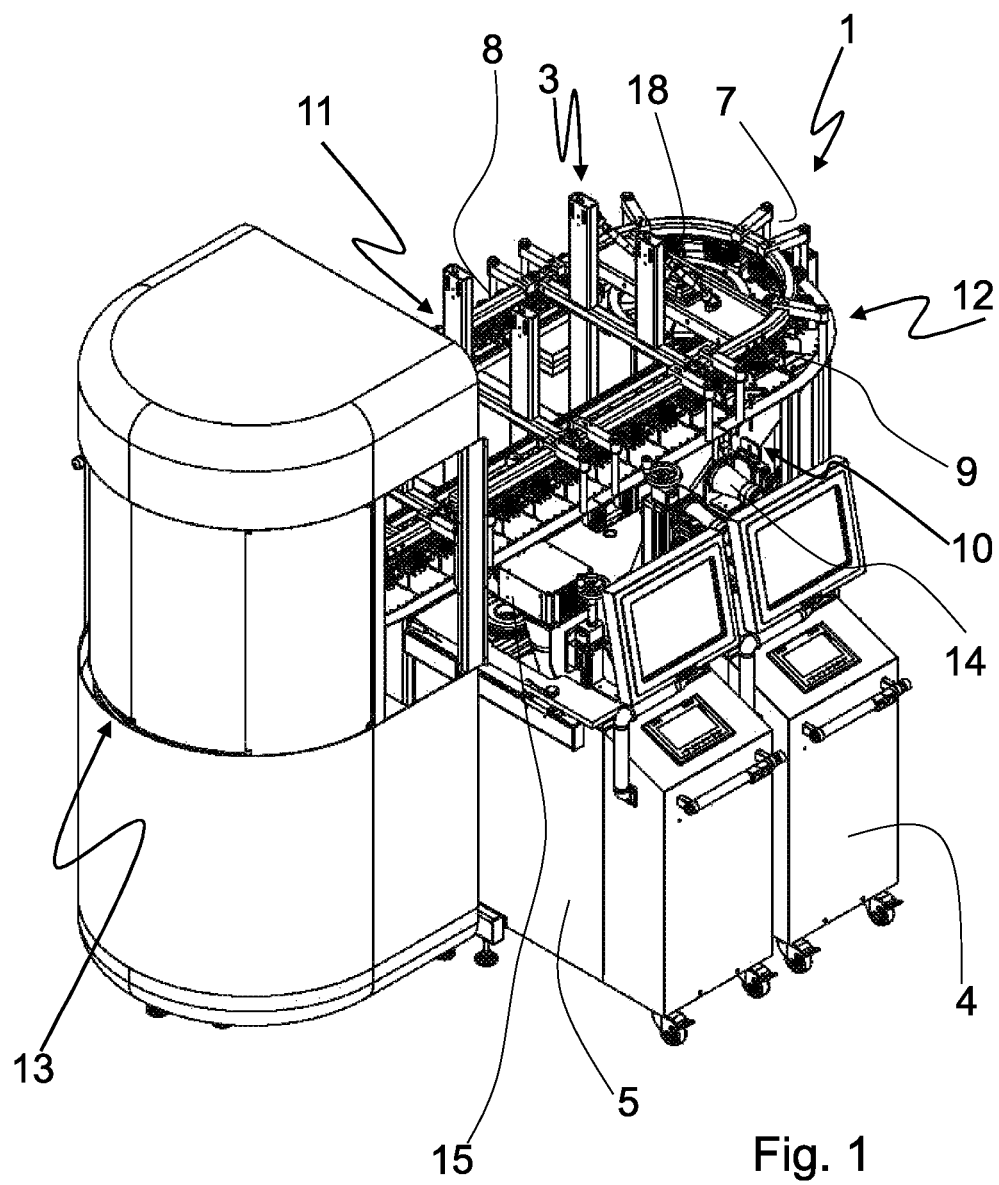
FIG. 1 is a partially broken-away isometric view of an inspection system according to one embodiment of the present invention.

An implementation of the inspection system according to the invention will now be described using an example. FIG. 1 shows an isometric view of the whole inspection system. This figure will be used repeatedly to describe the operation of the system.

The inspection system 1 is used to inspect a plurality of screws as inspection objects in the sense of the present application. The screws are delivered as loose material and fed into the inspection via a feed device 2. In addition to the feed device 2, the inspection system 1 comprises a conveying device 3, an ejecting device (not shown in the figure) and two inspection units 4, 5.

Figure 5:
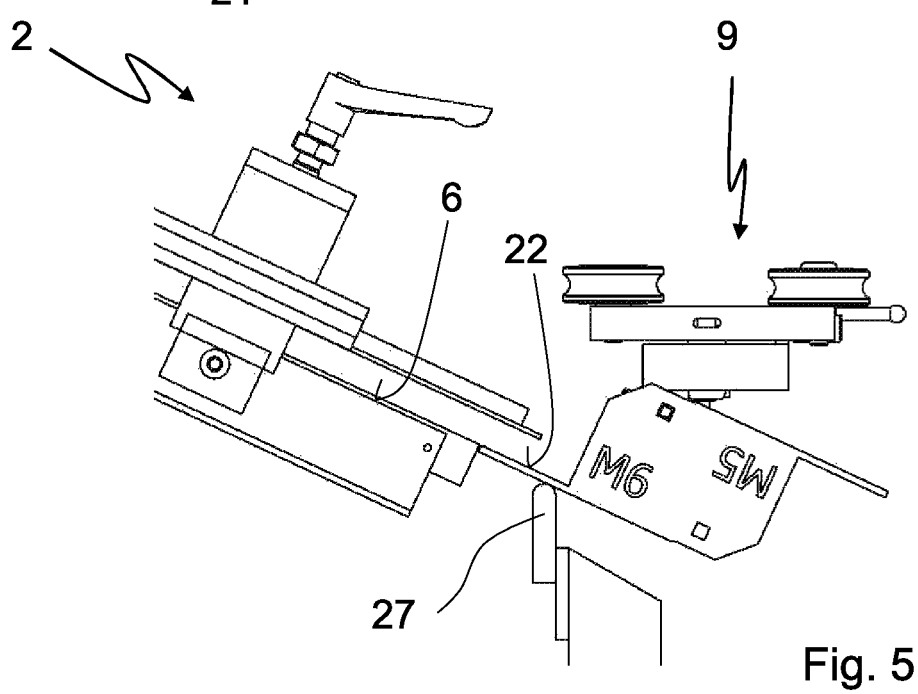
FIG. 5 is a side view of the roller carriage of FIG. 4 with the feed device.

In the shown embodiment, the feed device 2 is driven by gravity; i.e., the individual screws slide over a feed bevel 6 in the direction of the conveying device 3 due to their mass. This is shown in the side view of FIG. 5. The screws are already lined up in the feed device 2, but are still in direct contact with one another so that they are not yet separated. The screws hang on the feed bevel 6 with their heads or the surface on the underside of the screw heads. The conveying device 3 always picks up exactly one screw from the feed device 2 and conveys it along a conveying path with a spacing to the preceding screw and to the following screw. The conveying path is described in detail below.

In the sense of the present application, the path along which the screws travel between the feed position 7, at which the feed device 2 is disposed, and the ejecting device is referred to as the conveying path. The path along which the receptacles for the individual screws move in the conveying device 3 as a whole is referred to as the movement path.

The conveying device 3 comprises a rail element 8 and a plurality of carriages 9 guided on this rail element 8. The movement path of the receptacles for the screws is substantially O-shaped, with two straight, oppositely disposed sections 10, 11 and two curved sections 12, 13 which each deflect the movement path of the carriages by 180°. The two inspection units 4, 5 are disposed on the straight section 10 of the movement path and thus of the conveying path of the screws. The arrangement of the inspection units along the straight section of the conveying path has two advantages, which are explained in more detail in the following.

Each of the two inspection units 4, 5 comprises a sensor 14, 15. The sensor 14 of the first inspection unit 4 is a CCD camera for visual inspection of the individual screws. The sensor 15 of the second inspection unit 5, on the other hand, is an eddy current measuring head for detecting cracks in the individual screws. Since the two inspection units 4, 5 are disposed along the straight section 10 of the conveying path, the spacing between the individual inspection specimens and the respective sensor 14, 15 along the measuring section that lies on the straight section of the conveying path does not change. There is consequently no need to factor out artifacts that occur because the spacing between the inspection object and the sensor changes as a result of a curved measuring section.

The conveying device 3 is constructed in a modular manner from a plurality of segments which are connected to one another in a releasable and interchangeable manner. The shown conveying device 3 consists of two head-side segments 16, which carry the curved sections of the rail element 8. The curved sections of the rail element 8 each bring about a deflection of 180°. Provided between said two head-side segments 16 are two straight segments 17, each of which carries two oppositely disposed straight rail sections. The straight segments 17 of the conveying device can be removed from or inserted into the inspection system 1 with a few simple steps. The overall length of the inspection system, in particular the length of the straight sections of the conveying path, can thus be adapted on site to the respective inspection task. Depending on the length of the straight section of the conveying path, more or fewer inspection units 4, 5 can be held on the straight conveying path, making it possible to carry out a wide variety of inspection tasks.

Since the two segments 17 both comprise two oppositely disposed straight rail sections, when a straight segment 17 is added, inspection units can respectively be held on the opposite sides.

One of the curved segments 16 also carries a drive motor 18 for the carriages 9 of the conveying device 1. The individual carriages 9 are driven via a toothed belt guided over two timing pulleys 19, 20. Each of the carriages 9 is hooked into the toothed belt.

Each of the carriages 9 is guided on the rail element 8 by means of a roller 26. The rail element 8 extends through two of the four rollers 26.

Figure 4:
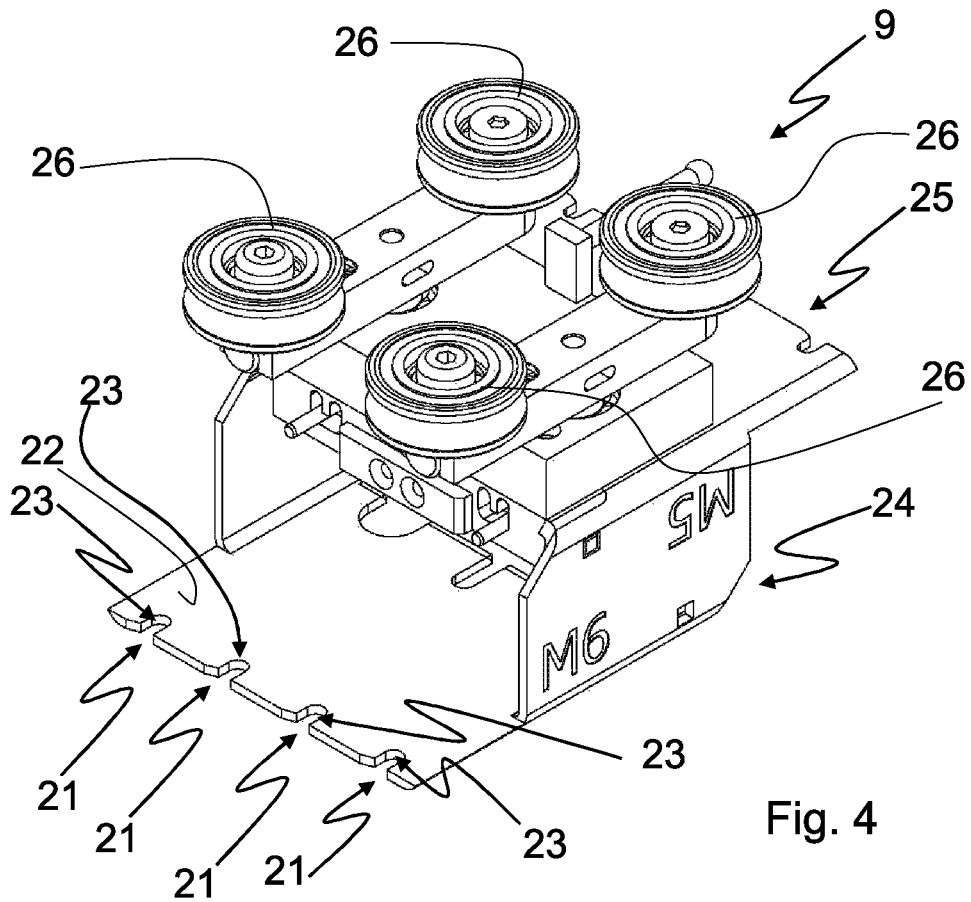
FIG. 4 is an isometric view of a roller carriage of the conveying device of FIGS. 2 and 3.

In the shown embodiment, as depicted in FIG. 4, each of the carriages 9 carries four receptacles 21 for exactly one respective screw. Each of the receptacles 21 comprises an elongated hole 23 as a perforation in the sense of the present application in a support surface 22. In the shown embodiment, all of the elongated holes 23 are provided in the same support surface 22. Each of the elongated holes 23 comprises an opening toward the edge of the support surface 22, so that the screws can be inserted with their cylindrical portions through this opening into the elongated hole 23. The undersides of the screw heads then rest on the support surface 22. During the inspection, i.e., when the screws are moved past the sensors 14, 15 of the inspection units 4, 5, the support surface 22 is aligned substantially horizontally, as can be seen in particular in the illustration of FIG. 4. The horizontal position of the support surface 22 is referred to in the sense of the present application as the first position of the support surface 22.

As stated above and illustrated in the figure, the screws are fed to the receptacles 21 driven by gravity on the feed bevel 6 of the feed device 2. The undercarriage 24 of the carriage comprising the receptacles and in particular the support surface 22 is configured such that it can pivot about a pivot axis relative to the upper carriage 25 comprising the rollers 26. The undercarriage 24 is pivoted in such a way that the support surface 22 moves from the first position into a second position. The second position of the support surface 22 can be seen in one of the carriages 8 in FIGS. 3 and 5. In this second position, the support surface 22 extends inclined relative to the horizontal, whereby the slope of the support surface 22 in the second position is adapted to the slope of the feed bevel 6 of the feed device. The screws from the feed bevel 6 can thus slide off the screw heads onto the support surface 22 without there being a discontinuity on which the screws can get stuck.

The feed is less prone to error. The undercarriage 24 and thus the support surface 22 are pivoted at the feed position 7 with the aid of an actuating cam 27, which is fixedly disposed at the feed position 7. When a carriage 9 reaches the feed position 7, the actuating cam 27 pushes the undercarriage 24 from the first position into the second position and, when it leaves the feed position, the undercarriage and thus the support surface 22 pivot driven by gravity from the second position back into the first position. In the first, horizontal position, the inspection objects are inspected at the inspection units 4, 5.

Figure 6:
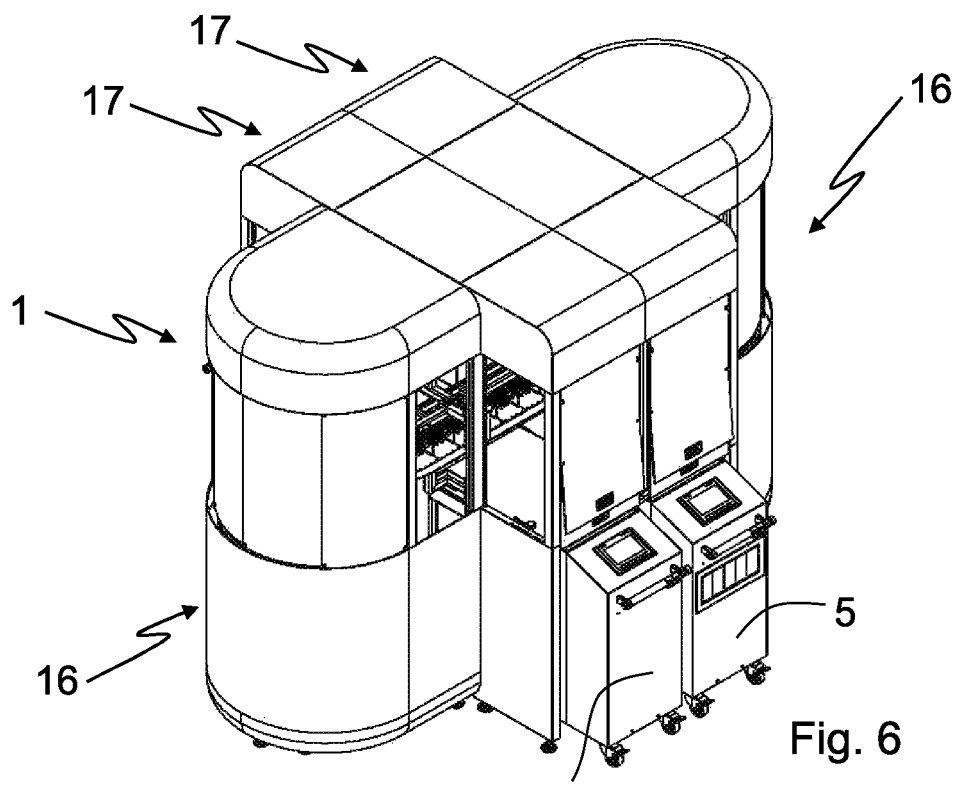
FIG. 6 is an isometric view of an inspection system according to one embodiment of the present invention.
Figure 7:
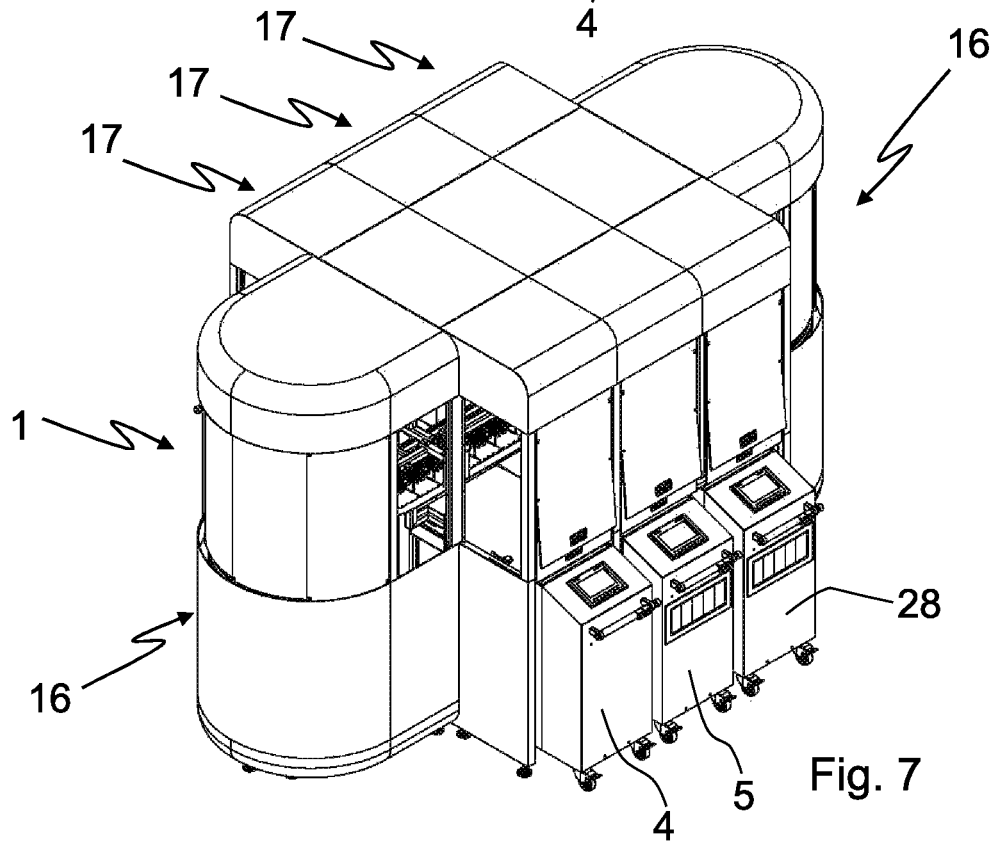
FIG. 7 is an isometric view of an inspection system according to a further embodiment of the present invention.

FIGS. 6 and 7 illustrate the modularity of the inspection system 1 according to the invention. The inspection system 1 shown in both FIGS. 6 and 7 is the same system in two configurations. The system in the configuration of FIG. 7 has been expanded by an additional inspection unit 28 compared to the configuration shown in FIG. 6. In the configuration of FIG. 6, the inspection system comprises the two head-side segments 16 of the conveying device and exactly two straight segments 17. The two inspection units 4, 5 already shown in FIG. 1 are held on the two straight segments 17. The reconfigured system of FIG. 7, on the other hand, comprises three straight segments 17 of the conveying device, so that the further inspection unit 28 is held on the third segment. Due to the modularity of the conveying device 3, the inspection system can be adapted to a wide variety of different inspection requirements.

Figure 2:
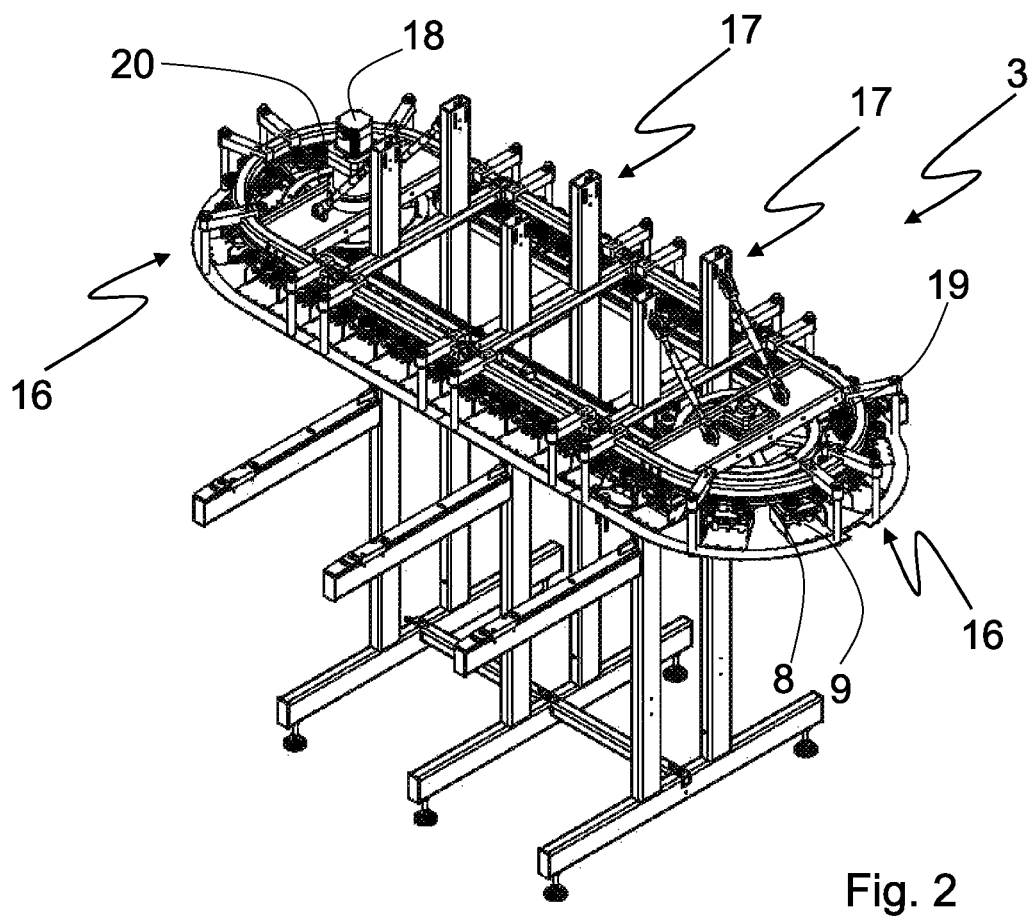
FIG. 2 is an isometric view of the conveying device from the inspection system of FIG. 1.
Figure 3:
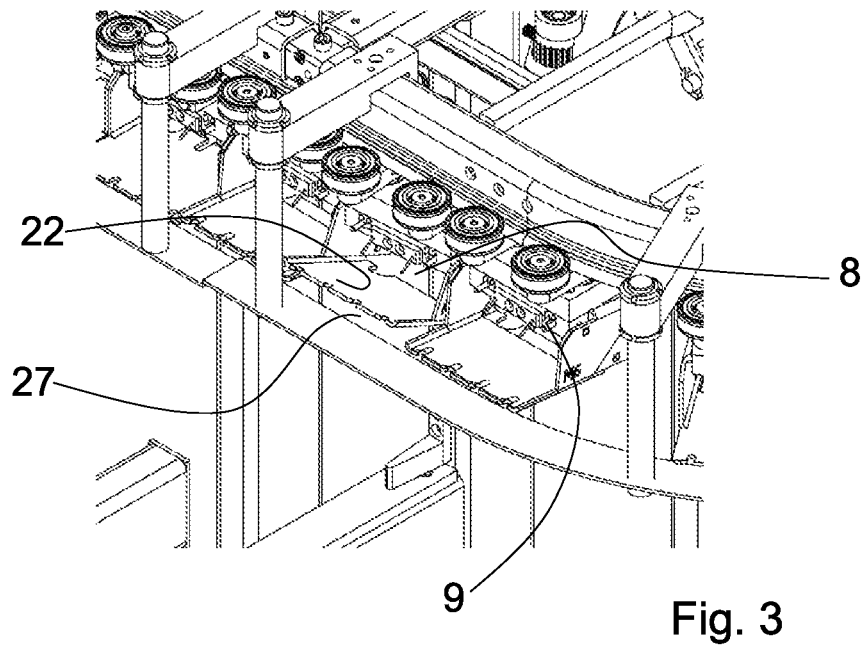
FIG. 3 is an enlarged, broken-away view of the conveying device of FIG. 2.
Figure 8:
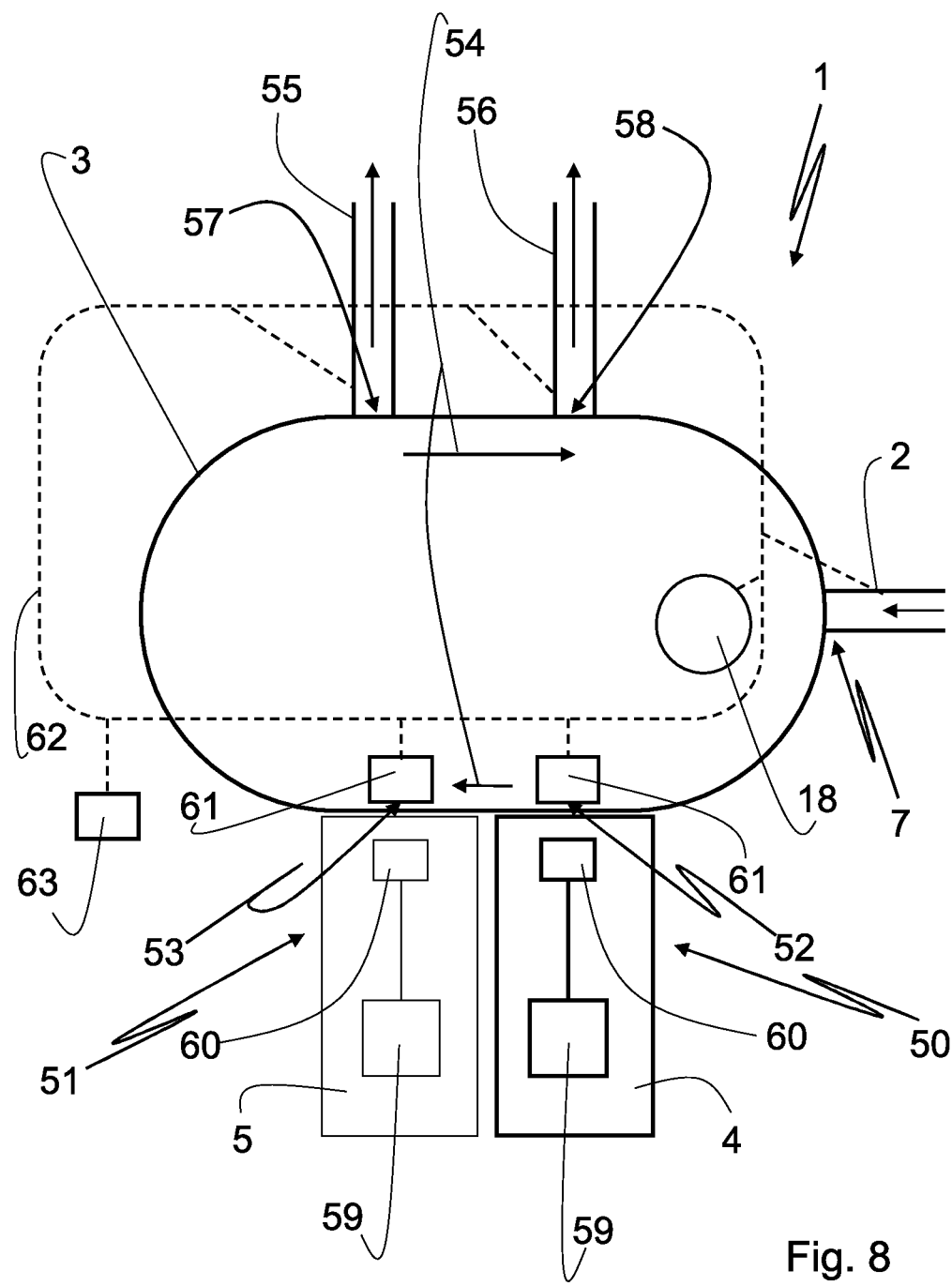
FIG. 8 is a schematic plan view onto a block diagram describing the inspection system of FIGS. 1 to 5.

FIG. 8 shows a plan view onto the inspection system of FIGS. 1-3 in a block diagram. In addition to the mechanical components, the block diagram schematically shows the elements for controlling the inspection system 1.

The feed of the separated inspection objects, here screws, takes place as described above at a feed position 7. The inspection system 1 comprises two inspection units 4, 5, which are disposed at a first inspection station 50 and a second inspection station 51 on the conveying path of the conveying device 3. The respective inspection positions 52, 53 are defined by the stations 50, 51 and the configuration of the inspection units 4, 5. The actual inspection, i.e., the sensing of the inspection objects, is carried out at these inspection positions. Viewed in the conveying direction 54, the inspection positions are behind the feed position 7.

As stated above, the inspection system 1 comprises two ejecting device 55, 56, which are respectively disposed at an ejection position 57, 58.

The two inspection units 4, 5 both comprise an inspection controller 59 and a data interface 60 in the form of a plug connector. This data interface 60 is referred to in the sense of the present application as a second data interface. When the inspection units 4, 5 are held at the respective inspection station 50, 51, the plug connectors, are plugged into complementary plug connectors 61 on the remaining part of the inspection system. In the sense of the present application, these complementary plug connectors 61 constitute the first data interfaces.

The first data interfaces 61 are connected to other elements of the inspection system via a bus line 62. A system controller 63, the ejecting devices 55, 56 and the drive 18 of the conveying device 3 are connected to the bus 62 as well.

In the shown embodiment, the system controller 61 takes on only the error management and the administration of the system 1. The system controller 61 in particular takes on the control of the drive motor 18, i.e., the specification of the conveying speed.

In the shown embodiment, the system parameters, such as the speed of the inspection objects along the inspection path and the occupancy of the receptacles of the conveying device 3, are stored in advance in the inspection controller 59 of each inspection unit 4, 5. When an inspection unit 4, 5 is inserted for the first time at the respective inspection station 50, 51, the inspection controller 59 detects at which inspection station 50, 51 and thus at which inspection position 52, 53 it is disposed.

For this purpose, the shown embodiment uses an identifier of the respective inspection station 50, 51, which is encoded in the form of the pin configuration of the sockets of the plug connectors 61 of the first data interfaces.

From the inspection position 52, 53, the respective inspection controller 59 calculates how long it takes for an inspection object inspected by it to be conveyed from the inspection position 52, 53 to the ejection position 57 or 58. The respective inspection controller 59 thus has all the information that enables it not only to carry out the actual inspection, but also to implement the result of the inspection by ejecting the respective inspection object at the correct ejection position 57, 58.

In the shown embodiment, items that have successfully passed the inspection with the two inspection units 4, 5 are ejected by the ejecting device 56 which is second in the conveying direction 54. Conversely, items that have failed the quality inspection are ejected from the first ejecting device 55.

Assuming the first inspection unit 5 detects an item that has failed the inspection, the inspection controller 59 issues an ejection command directly to the first ejecting device 55 via the plug connectors 60, 61 of the first and second data interfaces and the bus 60. The ejection command is generated at a point in time at which the inspection object has reached this first ejecting device 55.

For the purpose of the original disclosure, it should be noted that all of the features as they become apparent to a person skilled in the art from the present description, the drawings and the claims, even if they have been specifically described only in connection with specific other features, can be combined both individually and in any combination with other features or groups of features disclosed here, insofar as this has not been expressly excluded or technical circumstances make such combinations impossible or pointless. A comprehensive, explicit presentation of all conceivable combinations of features is omitted here solely for the sake of brevity and legibility of the description.

Although the invention has been presented and described in detail in the drawings and the foregoing description, this representation and description is merely an example and is not intended to limit the scope of protection as defined by the claims. The invention is not limited to the disclosed embodiments.

Modifications of the disclosed embodiments will be obvious to those skilled in the art from the drawings, the description and the appended claims. In the claims, the word "comprise" does not exclude other elements or steps, and the indefinite article "a" does not exclude a plurality. The mere fact that certain features are claimed in different claims does not preclude their combination. Reference signs in the claims are not intended to limit the scope of protection.

REFERENCE SIGNS

1 Inspection system
2 Feed device
3 Conveying device
4, 5, 28 Inspection unit
6 Feed bevel
7 Feed position
8 Rail element
9 Carriage
10, 11 Straight section
12, 13 Curved section
14, 15 Sensor
16 Head-side segments of the conveying device
17 Straight segments of the conveying device
18 Drive motor
19, 20 Timing pulley
21 Receptacle
22 Support surface
23 Elongated hole
24 Undercarriage
25 Upper carriage
26 Roller
27 Actuating cam
50, 51 Inspection station
52, 53 Inspection position
54 Conveying direction
55, 56 Ejecting device
57, 58 Ejection position
59 Inspection controller
60 Plug connector of the second data interface
61 Plug connector of the first data interface
62 Bus
63 System controller

The invention claimed is:

1. An inspection system configured for inspection of a plurality of separable inspection objects, comprising:
a feed device for the plurality of inspection objects,
a conveying device for the plurality of inspection objects,
an inspection unit and
an ejecting device,
wherein the feed device is configured and disposed such that the plurality of inspection objects can be fed by the feed device to a feed position of the conveying device,
wherein the conveying device comprises a plurality of receptacles, wherein each receptacle of the plurality of receptacles is configured and disposed such that exactly one inspection object of the plurality of inspection objects can be conveyed along a conveying path in said receptacle and that two respective inspection objects of the plurality of inspection objects have a spacing along the conveying path that is defined by the plurality of receptacles,
wherein the inspection unit is disposed at an inspection position on the conveying path and
wherein the ejecting device is disposed behind the inspection unit on the conveying path and is configured such that the plurality of inspection objects can be ejected from the plurality of receptacles of the conveying device by the ejecting device,
wherein the conveying device is configured such that the conveying path has at least one straight section and the inspection position is disposed on the at least one straight section, and
wherein the inspection unit comprises a housing having a defined installation space, wherein the housing can be releasably connected to the conveying device so that the inspection unit can be replaced with another inspection unit.

2. The inspection system according to claim 1, wherein the conveying device is configured such that the plurality of receptacles are guided on a closed movement path, wherein the conveying path takes up a part of the movement path.

3. The inspection system according to claim 1, wherein the inspection system comprises two inspection units, wherein the inspection units are disposed at two inspection positions along the conveying path, wherein the conveying path comprises two straight sections and wherein a first of the two inspection positions is disposed on a first of the two straight sections and wherein a second of the two inspection positions is disposed on a second of the two straight sections.

4. The inspection system according to claim 1, wherein each one of the plurality of receptacles comprises a support surface lying in a plane and a perforation in said support surface, wherein the perforation in the plane comprises an opening on one side, such that an inspection object of the plurality of inspection objects can be inserted through the opening into the perforation and wherein the support surface can be moved from a first position into a second position.

5. The inspection system according to claim 4, wherein the support surface can be pivoted about a pivot axis from the first position into the second position and wherein the pivot axis is parallel to a direction of movement of the receptacle.

6. The inspection system according to claim 4, wherein the feed device comprises a feed bevel, wherein the feed bevel is configured and disposed such that, when the inspection system is in operation, the plurality of inspection objects slide over the feed bevel in the direction of one of the plurality of receptacles at the feed position, wherein, in the second position, the support surface is parallel to a transfer section of the feed bevel.

7. The inspection system according to claim 4, wherein, in the first position, the support surface is disposed substantially horizontally.

8. The inspection system according to claim 4, wherein the conveying device comprises a stationary actuating cam at the feed position, wherein the receptacle and the actuating cam are configured and disposed such that that the actuating cam moves the support surface from the first position into the second position when the receptacle reaches the feed position.

9. The inspection system according to claim 1, wherein the housing has a defined width and wherein the straight section of the conveying path is an integer multiple of the width, so that a plurality of inspection units having the same width can be connected to the conveying device.

10. The inspection system according to claim 1, wherein the inspection unit comprises at least one sensor, wherein the sensor is disposed such that it senses a property of the plurality of inspection objects at the inspection position.

11. The inspection system according to claim 1, wherein the conveying device comprises a guide rail and a plurality of carriages guided on said guide rail, wherein each one of the plurality of carriages carries at least one of the plurality of receptacles.

12. The inspection system according to claim 1, wherein the conveying device comprises a plurality of segments and wherein the straight section of the conveying path comprises an integer multiple of segments.

13. The inspection system according to claim 1, wherein the inspection system further comprises
an inspection station at the inspection position of the inspection system,
a data transmission device,
a first data interface and
an identifier,
wherein the inspection unit comprises
an inspection controller comprising a read-out device and a second data interface connected to the inspection controller,
wherein the inspection station is configured such that the inspection unit is interchangeably connected to the inspection station,
wherein the second data interface is separably connected to the first data interface of the inspection system for exchanging data,
wherein the data transmission device is operatively connected at least to the ejecting device and via the first data interface and the second data interface to the inspection unit for transmitting information,
wherein the identifier biuniquely identifies the inspection position, wherein the identifier is encoded in such a way that the identifier can be read by the inspection unit when the inspection unit is inserted into the inspection station,
wherein the read-out device is configured such that the identifier can be read with the read-out device when the inspection system is in operation and
wherein the inspection controller is configured such that the inspection controller reads the identifier with the read-out device when the inspection unit is inserted into the inspection station.

14. The inspection system according to claim 13, wherein the identifier is encoded in an identification device which is disposed at the inspection station and can be read by the inspection unit.

15. The inspection system according to claim 2, wherein the inspection system comprises two inspection units, wherein the inspection units are disposed at two inspection positions along the conveying path, wherein the conveying path comprises two straight sections and wherein a first of the two inspection positions is disposed on a first of the two straight sections and wherein a second of the two inspection positions is disposed on a second of the two straight sections.

16. The inspection system according to claim 2, wherein each one of the plurality of receptacles comprises a support surface lying in a plane and a perforation in said support surface, wherein the perforation in the plane comprises an opening on one side, such that an inspection object of the plurality of inspection objects can be inserted through the opening into the perforation and wherein the support surface can be moved from a first position into a second position.

17. The inspection system according to claim 3, wherein each one of the plurality of receptacles comprises a support surface lying in a plane and a perforation in said support surface, wherein the perforation in the plane comprises an opening on one side, such that an inspection object of the plurality of inspection objects can be inserted through the opening into the perforation and wherein the support surface can be moved from a first position into a second position.

18. The inspection system according to claim 5, wherein the feed device comprises a feed bevel, wherein the feed bevel is configured and disposed such that, when the inspection system is in operation, the plurality of inspection objects slide over the feed bevel in the direction of one of the plurality of receptacles at the feed position, wherein, in the second position, the support surface is parallel to a transfer section of the feed bevel.

19. The inspection system according to claim 5, wherein, in the first position, the support surface is disposed substantially horizontally.

20. The inspection system according to claim 10, wherein the sensor is selected from a group consisting of a current sensor, a probe, a conductivity sensor and a camera or a combination thereof.

21. An inspection system configured for inspection of a plurality of separable inspection objects, comprising:
a feed device for the plurality of inspection objects,
a conveying device for the plurality of inspection objects, an inspection unit and an ejecting device, wherein the feed device is configured and disposed such that the plurality of inspection objects can be fed by the feed device to a feed position of the conveying device, wherein the conveying device comprises a plurality of receptacles, wherein each one of the plurality of receptacles comprises a support surface lying in a plane and a perforation in said support surface, wherein the perforation in the plane comprises an opening on one side, wherein each receptacle of the plurality of receptacles is configured and disposed such that exactly one inspection object of the plurality of inspection objects can be conveyed along a conveying path in said receptacle and that two respective inspection objects of the plurality of inspection objects have a spacing along the conveying path that is defined by the plurality of receptacles, wherein the inspection unit is disposed at an inspection position on the conveying path, wherein the ejecting device is disposed behind the inspection unit on the conveying path and is configured such that the plurality of inspection objects can be ejected from the plurality of receptacles of the conveying device by the ejecting device, and wherein the conveying device is configured such that the conveying path has at least one straight section and the inspection position is disposed on the at least one straight section.

22. An inspection system configured for inspection of a plurality of separable inspection objects, comprising:

a feed device for the plurality of inspection objects, a conveying device for the plurality of inspection objects, an inspection unit and an ejecting device, wherein the feed device is configured and disposed such that the plurality of inspection objects can be fed by the feed device to a feed position of the conveying device, wherein the conveying device comprises a plurality of receptacles, wherein each one of the plurality of receptacles comprises a support surface lying in a plane and a perforation in said support surface, wherein the support surface can be pivoted about a pivot axis from a first position into a second position, wherein each receptacle of the plurality of receptacles is configured and disposed such that exactly one inspection object of the plurality of inspection objects can be conveyed along a conveying path in said receptacle and that two respective inspection objects of the plurality of inspection objects have a spacing along the conveying path that is defined by the plurality of receptacles, wherein the inspection unit is disposed at an inspection position on the conveying path, wherein the ejecting device is disposed behind the inspection unit on the conveying path and is configured such that the plurality of inspection objects can be ejected from the plurality of receptacles of the conveying device by the ejecting device, and wherein the conveying device is configured such that the conveying path has at least one straight section and the inspection position is disposed on the at least one straight section.

\* \* \* \* \*